United States Patent
Foster et al.

(10) Patent No.: US 6,233,972 B1
(45) Date of Patent: May 22, 2001

(54) METHOD FOR PROTECTING GLASS SHEETS

(75) Inventors: Michelle R. Foster, Corning; David L. Tennent, Campbell, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/382,164

(22) Filed: Aug. 24, 1999

Related U.S. Application Data

(60) Provisional application No. 60/097,811, filed on Aug. 25, 1998.

(51) Int. Cl.⁷ .................................................. C03C 17/00
(52) U.S. Cl. ................. 65/60.3; 65/28; 427/154; 427/164; 427/165; 427/168
(58) Field of Search .................................... 427/162, 164, 427/165, 168, 154, 421; 428/426, 436, 437; 65/60.1, 60.3, 28

(56) References Cited

U.S. PATENT DOCUMENTS

| | | | |
|---|---|---|---|
| 3,577,256 | * 5/1971 | Benford, Jr. et al. | 117/6 |
| 4,055,441 | * 10/1977 | Taylor et al. | 134/10 |
| 4,200,671 | * 4/1980 | Krajewski et al. | 427/154 |
| 4,544,395 | 10/1985 | Evans . | |
| 5,418,006 | * 5/1995 | Roth et al. | 427/154 |
| 5,523,117 | * 6/1996 | Woodhall et al. | 427/156 |
| 5,863,599 | * 1/1999 | Lew | 427/154 |

FOREIGN PATENT DOCUMENTS 811098   4/1969   (CA) .

* cited by examiner

Primary Examiner—Fred J. Parker
Assistant Examiner—Jennifer Calcagni
(74) Attorney, Agent, or Firm—Maurice M. Klee

(57) ABSTRACT

A method of providing a protective layer for a glass sheet. The protective layer provided by depositing a solution of a polymer and water on a glass sheet at a temperature high enough to provide a layer that is insoluble in water below a temperature of about 20° C. The layer is soluble in water at a temperature above about 60° C., so that the protective layer can be removed by rinsing in hot water.

10 Claims, No Drawings

METHOD FOR PROTECTING GLASS SHEETS

CROSS REFERENCE TO RELATED PROVISIONAL APPLICATION

This application claims the benefit under 35 USC §119(e) of U.S. Provisional Application Ser. No. 60/097,811 filed Aug. 25, 1998, the content of which in its entirety is hereby incorporated by reference.

FIELD OF THE INVENTION

The present invention relates to protective coatings for glass sheets. More particularly, the present invention relates to a method for applying and removing a temporary protective coating to a glass sheet during manufacture of the sheet.

BACKGROUND OF THE INVENTION

Protection of sheet glass during the manufacturing process is necessary to prevent scratches and damage to the major surfaces of the glass. Scratching and damage to the glass sheet typically is inflicted by handling equipment or during cutting and edge grinding steps. Damage also occurs as a result of particles or chips contacting the surface of the sheet during initial cutting and handling of the sheet. One known method of protecting the glass sheet is to apply a polymer film on both major surfaces of the glass sheet. One major surface has a polymer film attached to the sheet with an adhesive, and this sheet is removed after the edge finishing of the sheet is completed. The other major surface has a film which is attached by static charge. This film is removed prior to the finishing process.

While the adhesive backed film does protect the surface from scratching induced by the handling equipment, it causes other problems. One problem associated with the adhesive backed film is the build up of glass chips during the edge finishing process which causes scratching of the glass near the edge due to chips entrapped in polymer caught in the finishing equipment. Another problem with the adhesive backed polymer film is adhesive residue.

It would be desirable to provide a temporary protective coating early in the glass sheet manufacturing process that could easily removed after processing of the glass. It would be useful if the coating could be applied at a point during the manufacturing process wherein a separate, additional manufacturing step was not required. Finally, it would be advantageous to have a coating that is not environmentally harmful.

PRIOR ART

Canadian Patent No. 811,098 describes the use of hydroxyethyl cellulose and polyvinyl alcohol (PVA) to produce temporary coatings on glass. This patent specifically teaches that when solutions of these polymers are applied by spraying, the glass should be at a temperature of below about 95° C. to avoid flash evaporation of the water and consequent formation of a film of poor properties. That is, the patent teaches that the glass should have a temperature less than the boiling point of water.

In direct contrast, in accordance with the present invention, it has been found that the temperature of the glass needs to be substantially above the boiling point of water to produce coatings which are able to withstanding washing with water whose temperature is less than 20° C.

As shown in Example 6 below, a PVA solution applied to glass at room temperature resulted in a coating that could be removed using water having a temperature of 10° C. As shown in Examples 4–5, when the same PVA solution was applied to glass having a temperature above 200° C., the coating was not removed by washing with 10° C. water, but was removed with water having a temperature of 90° C. The following table summarizes these results which distinguish the present invention from the disclosure of Canadian Patent No. 811,098:

| Glass Temperature | Removal of coating with water whose temperature is less than 20° C. | Removal of coating with water whose temperature is above 60° C. |
| --- | --- | --- |
| Above about 200° C. | No | Yes |
| Below 100° C. | Yes | Yes |

SUMMARY OF INVENTION

Accordingly, the present invention generally provides a method of protecting a glass sheet from scratching, abrasion and the deposition of glass chips and other contaminants comprising depositing a solution of water and a polymer onto at least one major surface of the glass sheet after formation of the glass sheet. Preferably, during the deposition step, the sheet is at a temperature sufficient to crosslink the polymer and form a protective layer that is generally insoluble in water at a temperature below about 10° C., preferably below about 20° C. It is also preferred that the protective layer is soluble in water at a temperature above about 60° C., preferably above about 80° C., so that the protective layer can be rinsed from the glass sheet at a point in the production process in which the protect layer is not required. This can be done immediately before final inspection of the glass. Alternatively, if desired, the protective layer can remain on the sheet during shipping and rinsed off in water after shipping.

In a preferred embodiment, the solution is deposited by spraying and the polymer consists of polyvinyl alcohol. Preferably, the solution is deposited immediately after forming the glass sheet and the temperature of the glass sheet is above about 200° C. and below about 450° C.

Several important advantages will be appreciated from the foregoing summary. One advantage of the present invention is that temporary protective coatings can be provided for glass sheets that protect the glass sheets from scratches, abrasion, chips and contaminants during the glass manufacturing process, particularly during cutting and edge grinding. Another advantage is that the coating can be relatively easily removed by rinsing in water above about 60° C., preferably above about 80° C. Additional features and advantages of the invention will be set forth in the description which follows. It is to be understood that both the foregoing general description and the following detailed description are exemplary and explanatory and are intended to provide further explanation of the invention as claimed.

DETAILED DESCRIPTION

The present invention is directed to providing a protective layer on a sheet of glass. Preferably, the protective layer is provided early in the manufacturing process so that the sheet is protected from scratching, abrasion, chips and contamination during subsequent processing steps. For example, in a process in which the sheet of glass is drawn by a drawing apparatus, it is preferred that the solution is deposited immediately after drawing.

It is essential that the solution is deposited at a temperature to form a protective layer that can subsequently be removed by rinsing with hot water, but can not removed by warm or cold water. As used herein, hot water is water that is at a temperature greater than about 60° C., preferably about 80° C., and warm or cold water is water that is at a temperature below about 10° C., preferably below about 20° C.

The solution of water and polymer can be applied to the glass sheet in any convenient way. For example, the solution can be rolled, brushed, or applied by a doctor blade. In experiments in which a glass sheet was dipped into solutions of polyvinyl alcohol and water, the coatings in these experiments were all soluble in 10° C. water within 1 minute. In a preferred embodiment, the coating is sprayed on in solution form.

Applicants experimented with several materials in an effort to provide a temporary protective coating on flat glass sheets that could be removed without damage to the glass or without the use of pernicious chemicals. Inorganic materials were excluded because the reactive nature of inorganic coatings attacked the surface of the glass. Also materials containing sodium were excluded because sodium causes problems for certain end uses of flat glass, for example, thin film transistors. Experiments were performed with simple and complex sugars and starches, but these materials either decomposed at higher temperatures, or were soluble in water at temperatures below about 10° C.

The following non-limiting examples serve to illustrate the principles of the present invention. In each of the examples a Binks spray gun attached to an air line was used to deposit a polyvinyl alcohol (PVA) solution onto a heated glass substrate. The glass substrates were Corning 1737 glass samples. In each of the examples the solutions were made up of 3 weight percent PVA in deionized water. The glass samples were heated to the temperatures indicated in each example.

Three different hydrolyzed grades of PVA were utilized in the examples. Each of the grades of PVA are available from Air Products and Chemicals in Allentown, Pa. Airvol 125 is greater than 99.3% hydrolyzed, Airvol 325 is between 98.0% and 98.8% hydrolyzed, and Airvol 523 is between 87.0 and 89.0 hydrolyzed. Solubility in water was determined by soaking the coated glass sheets in deionized water at 10° C. and 90° C.

EXAMPLES 1–3

A 3% solution of Airvol 125 and deionized water was mixed and sprayed with the Binks sprayer onto three sets of glass sheets that were fired to 500° C., 400° C. and 300° C. The samples fired at 500° C. decomposed and were not tested for solubility. One set of sheets was placed in deionized water at 10° C. for two minutes and one set of sheets was placed in deionized water at 90° C. for two minutes. Both sets of samples (one fired at 300° C. and the other fired at 400° C.) were not soluble in 10° C. or 90° C. deionized water.

EXAMPLES 4–5

A 3% solution of Airvol 325 was mixed and applied with the Binks sprayer to two sets of glass sheets fired to 300° C. and 400° C. One sample from each set of glass sheets was placed in deionized water at 10° C. and another sample from each set was placed in deionized water at 90° C. The samples fired at 300° C. and 400° C. were not soluble in 10° C. water, but were soluble in 90° C. water.

EXAMPLE 6

A 3% solution of Airvol 325 was mixed and applied with the Binks sprayer to a set of glass sheets at room temperature. One sample from the set was placed in deionized water at 10° C. The coating on the sheet was found to be soluble in the 10° C. water.

EXAMPLES 7–8

A 3% solution of Airvol 523 was mixed and applied using the Binks sprayer to two sets of glass sheets fired to 300° C. and 400° C. One sample from each set of glass sheets was placed in 10° C. water. The sheets placed in 10° C. water were soluble. Therefore, samples were not placed in 90° C. water because of the results in the 10° C. water.

The above examples show that a key aspect of the coating process of the present invention involves application of the coating while the glass sheet is hot. If the PVA solution is applied onto glass sheets at room temperature, the coatings were soluble in cold water. The lower limit of the temperature of the glass sheet during application is about 200° C., with the temperature of the glass during application preferable being above 300° C. The upper limit of the temperature of the glass during application is about 450° C., with the temperature of the glass during application being below about 400° C.

Another key aspect evident from the above examples is the degree of hydrolyzation of the PVA. The 98.0–98.8% PVA had the best results. The PVA with a higher degree of hydrolyzation was not soluble in 90° C. water, and thus is too permanent for the method of the present invention. The PVA with a lower degree of hydrolyzation was soluble in 10° C., and thus is not useful for the present invention.

Another parameter investigated was the weight percent of PVA in the water solution. Since Airvol 325 possessed the desired solubility properties, experiments were conducted with this PVA to determine the optimum weight percent of PVA in solution. Solutions were formulated with 3%, 6% and 10% PVA dissolved in deionized water. All of the compositions exhibited the desired solubility properties. However, the 3% solution resulted in a coating that was thin and uneven in application. The 10% solution was too viscous for effective application by spraying. The 6% solution of Airvol 325 provided a reasonably thick, even coverage of the glass sheet, and is relatively easy to apply by the presently preferred spraying method. Concentrations higher and lower than 6% can, of course, be used if desired. Indeed, concentrations less than 3% or greater than 10% can be used by tuning the spray equipment, e.g., the nozzle structure, pressure, and flow rate, to operate at these concentrations.

It will be apparent to those skilled in the art that various modifications and variations can be made in the method of the present invention without departing from the spirit or scope of the invention. For example, it is believed that other polymers in addition to and perhaps in combination with polyvinyl alcohol could be utilized in accordance with the present invention. In addition, crosslinking agents may be utilized to aid in forming a protective layer that is soluble in hot water. For example, it is believed that acrylates could be used. One polymer that did not perform very well was methylcellulose. Thus, it is intended that the present invention cover the modifications and variations of this invention provided they come within the scope of the appended claims and their equivalents.

What is claimed is:

1. A method of protecting a glass sheet from scratching, abrasion and contamination comprising depositing a solution of water and a polymer onto at least one major surface of the glass sheet after formation of the glass sheet in a glass manufacturing process while the temperature of the glass sheet remains above about 200° C. but below about 450° C., said temperature being sufficient to crosslink the polymer and form a protective layer that is generally insoluble in water whose temperature is below about 20° C., and wherein the protective layer is soluble in water whose temperature is above about 80° C.

2. The method of claim 1, wherein the solution is deposited by spraying.

3. The method of claim 1, wherein the polymer comprises polyvinyl alcohol.

4. The method of claim 1, wherein the solution is deposited while the temperature of the glass sheet remains above about 300° C. but below about 400° C.

5. The method of claim 1, wherein the solution comprises 6 weight percent polyvinyl alcohol in water and the solution is deposited by spraying.

6. A method of protecting a glass sheet from scratching, abrasion and contamination comprising depositing a solution of water and a polymer onto at least one major surface of the glass sheet after formation of the glass sheet in a glass manufacturing process while the temperature of the glass sheet remains above about 200° C. but below about 450° C., said temperature being sufficient to crosslink the polymer and form a protective layer that is generally insoluble in water whose temperature is below about 20° C., and wherein the protective layer is soluble in water whose temperature is above about 60° C.

7. The method of claim 6, wherein the solution is deposited by spraying.

8. The method of claim 6, wherein the polymer comprises polyvinyl alcohol.

9. The method of claim 6, wherein the solution is deposited while the temperature of the glass sheet remains above about 300° C. but below about 400° C.

10. The method of claim 6, wherein the solution comprises 6 weight percent polyvinyl alcohol in water and the solution is deposited by spraying.

* * * * *